United States Patent [19]

Chevalier

[11] 4,033,612
[45] July 5, 1977

[54] ARMORED FLEXIBLE PIPE EQUIPPED WITH A RIGID COUPLING

[75] Inventor: André Chevalier, Pantin, France

[73] Assignee: Institut Francais du Petrole, des Carburants et Lubrifiants, France

[22] Filed: Jan. 23, 1975

[21] Appl. No.: 543,307

Related U.S. Application Data

[62] Division of Ser. No. 414,103, Nov. 8, 1973, Pat. No. 3,874,064.

[30] Foreign Application Priority Data

Nov. 21, 1972  France .............................. 72.41397

[52] U.S. Cl. ................................. 285/149; 285/297
[51] Int. Cl.² ......................................... F16L 39/02
[58] Field of Search .................. 285/149, 297, 294

[56] References Cited

UNITED STATES PATENTS

| | | | |
|---|---|---|---|
| 1,365,306 | 1/1921 | Dickinson | 285/149 |
| 1,368,919 | 2/1921 | Fulton | 285/149 X |
| 2,809,056 | 10/1957 | Kaiser | 285/149 |
| 2,940,778 | 6/1960 | Kaiser | 285/149 X |
| 3,004,779 | 10/1961 | Cullen et al. | 285/149 |
| 3,415,545 | 12/1968 | Frey et al. | 285/297 X |
| 3,531,143 | 9/1970 | Horvath et al. | 285/149 |

Primary Examiner—Thomas F. Callaghan
Attorney, Agent, or Firm—Craig & Antonelli

[57] ABSTRACT

The invention provides a process for securing a rigid coupling member to one end of a flexible pipe which comprises an armouring formed by a metal strip wound with a short pitch around a tubular core.

According to this process this armouring is cut out along a cross-section of the metal strip which is then inserted into a corresponding recess of the coupling member, in which a solidifiable material is subsequently injected.

6 Claims, 6 Drawing Figures

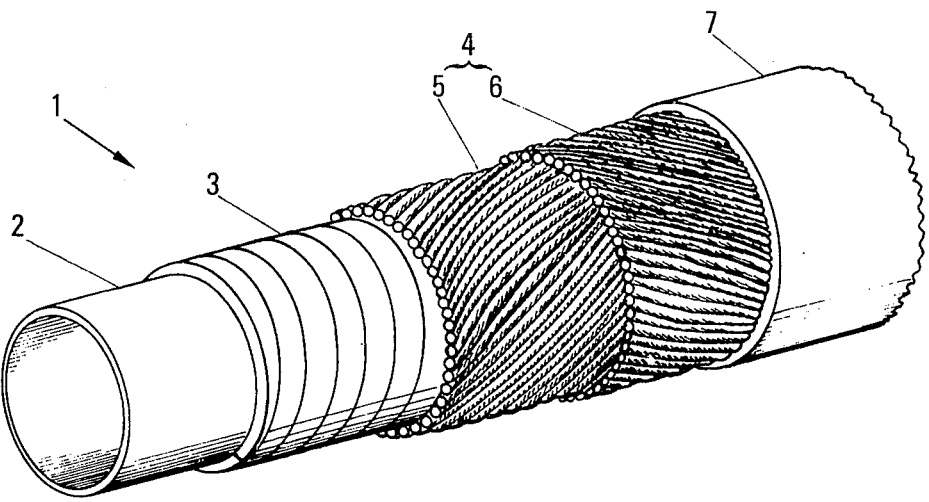
FIG. 1
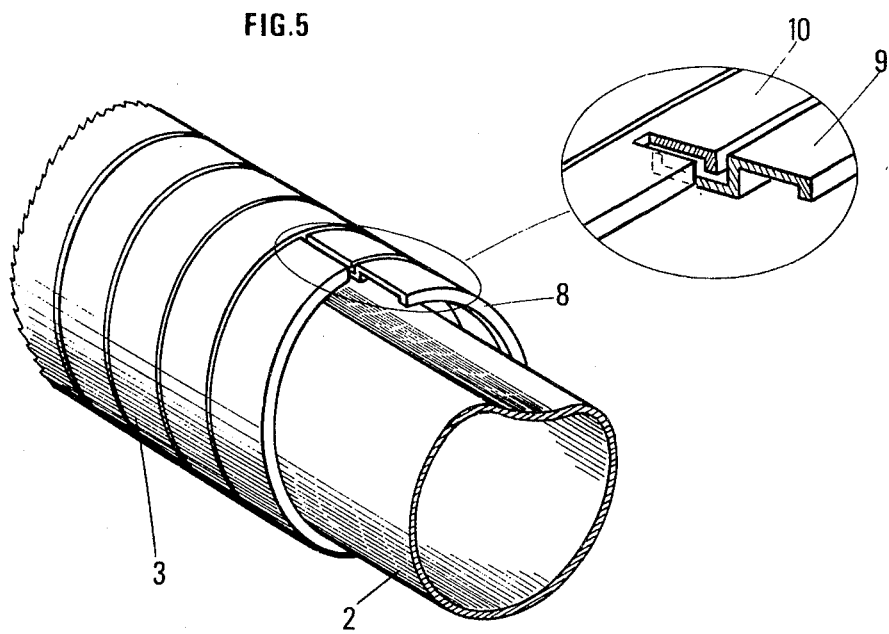
FIG. 5
FIG. 5A

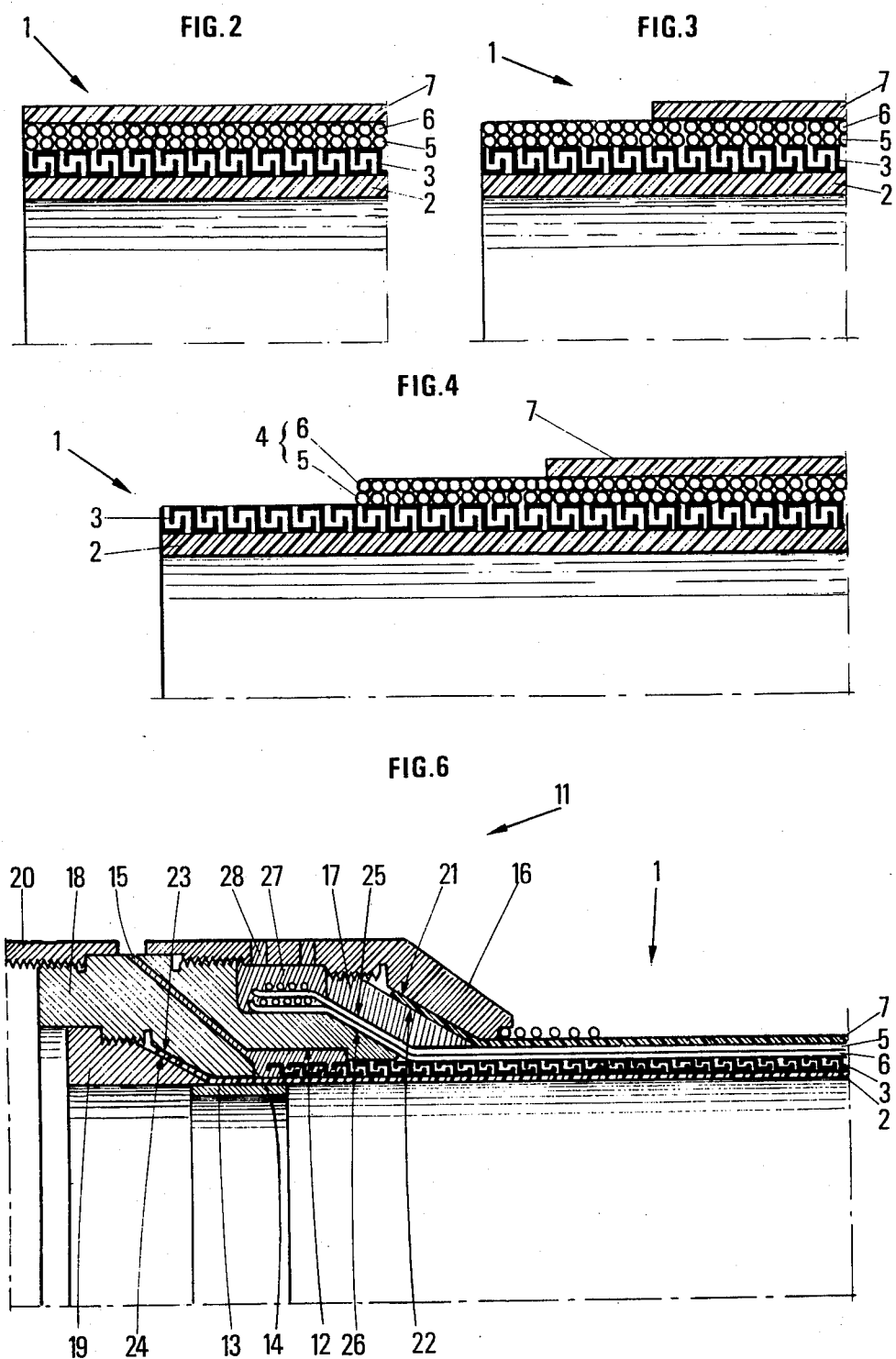

ARMORED FLEXIBLE PIPE EQUIPPED WITH A RIGID COUPLING

This is a division of application Ser. No. 414,103 filed Nov. 8, 1973, now U.S. Pat. No. 3,874,064.

The present invention relates to a process for securing a coupling to one end of an armored flexible pipe, and also concerns the armored flexible pipe obtained thereby.

More precisely the coupling is fixed in the extension of an armored flexible pipe which comprises, from the interior to the exterior, a tight tubular core, at least one armouring around this core, this armouring being formed of a wire, strand or strip or a metal shaped member helically wound with a short pitch directly on the tight tubular core.

The pipe may comprise at least one armouring capable of withstanding tractive and/or torsional stresses applied to the pipe, and optionally an outer covering providing for the sealing of the pipe with respect to the surrounding medium.

Up to now, a coupling could be secured to one end of a flexible pipe of the above-defined type only after having cut each constituting element of the pipe (tubular core, armourings, etc.) at a suitable length so that these elements could be properly positioned in the coupling.

Some of these operations are time-consuming and difficult to carry out. This is more specially true when it is necessary to cut out in a plane perpendicular to the pipe axis the metal armouring which covers the tubular core.

This operation is particularly difficult to carry out due to the small pitch of this armouring since it must not damage the tubular core when the end thereof projects beyond the end of the armouring, so as to avoid, when the pipe is in operation any leakage at the location of the coupling.

The object of the present invention is accordingly to reduce the difficulties presented by the prior coupling procedures, by providing a process which is easier to carry out, for securing a coupling to the end of a flexible pipe.

The invention will be well understood and advantages thereof will become apparent from the following description of an embodiment thereof, illustrated by the accompanying drawings wherein :

FIG. 1 illustrates the structure of the pipe to one end of which the coupling must be secured.

FIG. 2 to 6 diagrammatically illustrate the different steps of the process for securing the coupling to the end of the armoured flexible pipe.

FIG. 1 illustrates a type of armoured flexible pipe to the end of which a coupling must be secured. This flexible pipe 1 comprises a flexible tubular core 2 made of a plastic or elastomeric material.

The core 2 provides for the inner tightness of the pipe. An elongated metal element is coiled around the core 2 with a short pitch and constitutes an armouring 3 withstanding the pressure differences between the interior and the exterior of the pipe. This elongated element may, for example, consist of a metal strip forming interlocking convolutions, this strip having as shown in the drawings S- or Z-shaped cross-section, or by metal strip of rectangular cross-section, or also by a wire or metal strand, as it is well known to those skilled in the art. In the case where the flexible pipe 1 is subjected to high axial stresses, the armouring 3 is surrounded by an armouring 4 withstanding the traction stresses.

This armouring 4 consists, for example, of two layers 5 or 6 of wires or metal strands, helically wound in opposite directions with little inclination angles relative to the pipe axis, i.e. with a large pitch.

Optionally, if necessary, an armouring for withstanding the torsional stresses or torques may be provided, this armouring being of the same type as the armouring 4.

An outer covering 7, made of plastic material or of elastomer, may complete the above-described assembly, for sealing a part or the whole of the pipe assembly (according to its position relative to the other components of the pipe) with respect to the external medium.

The different successive operation which must be achieved before the coupling is secured are illustrated by FIGS. 2 and 6.

After pipe 1 has been cut at the required length (FIG. 2), each of the elements which constitute the pipe layers is uncovered by successively cutting out over a determined portion, the external covering 7 (FIG. 3) and the armouring 4 (FIG. 4). These operations are performed using conventional means and need not be described in detail.

The following step consists in cutting out at the proper length the armouring 3 formed by the helical winding with a short pitch.

Up to now, it was conventional to cut the armouring 3 along a plane at right angles to the pipe axis, as illustrated by FIG. 1. Such an operation was difficult since the armouring 3 had to be cut out without causing any damage to the tubular core 2.

To obviate this drawback a new process is used, as illustrated by FIG. 5.

The tubular core 2 is locally deformed so as to provide, at the place where the armouring 3 is to be cut, a sufficient spacing between the core 2 and the armouring 3.

The metal strip 8 is then cut out substantially along a cross-section thereof, using for example a saw formed by a rotary disc.

FIG. 5 A illustrates on a larger scale said cutting. As it is apparent, the last convolution 9 has been fully cut out, the adjacent convolution 10 having been partially cut out while cutting the portion of the convolution 9 interlocking with the convolution 10. In this way the cross sectional area which is cut out is reduced to a minimum, thus considerably reducing the time spent for this operation, as compared to that required by the method wherein the armouring 3 is cut along a plane perpendicular to the pipe axis.

The coupling, designated as a whole by reference numeral 11 (FIG. 6), is then positioned at the end of the flexible pipe 1 and is provided with means for clamping the tubular core 2 and the outer covering 7, with means for anchoring the traction resisting armouring, and optionally with means for anchoring the torque resisting armouring. Embodiments of such means will be described hereunder by way of example.

The coupling is provided with a bore 12 wherein with some clearance the pressure resisting armouring 3 is inserted. The coupling being positioned as shown by FIG. 6, an expansible ring 13 is placed inside the pipe so as to support the tubular core 2 between the end of the armouring 3 and the bottom 14 of the bore 12. A channel 15 which is provided in the coupling 11 and opens into the bore 12 permits the introduction of a solidifiable material into the bore 12.

The anchoring of armouring 3, thus achieved provides, at the level of the coupling, on the one hand, the anchoring of the pressure resisting armouring 3 and, on the other hand, a continuous smooth surface on which the tubular core will bear, preventing the latter, in particular, from contact with the uneven surface of the armouring 3 more particularly, at the end of the convolution 9 (FIG. 5 A).

The ring 13, which, during the injection of the solidifiable material into the bore 12 prevented any deformation of the tubular core 2, is removed after solidification of the injected material.

The material which provides for the anchoring of the armouring 3, may be for example, a metal alloy having a melting temperature lower than the maximum temperature which the tubular core 2 can withstand without deterioration, or a thermosetting epoxy resin, or any other material which can easily be injected through opening 26 and flow through channel 15 and which, after setting or polymerizing, possess sufficient qualities of hardness and adherence to steel without being liable any substantial volume reduction.

The coupling shown in FIG. 6 comprises an external ring 16, an auxiliary clamping ring 17, an intermediary ring 18 in which is provided the bore 12, an internal clamping ring 19 and a ring 20 for securing the coupling 11 to a not illustrated connecting device.

At the level of this coupling, a continuous sealing is obtained by clamping the covering 7 and the core 2 respectively between a conical bore 21 of the external ring 16 and a complementary conical bore 22 of the auxiliary clamping ring 17, and between a conical bore 23 of the intermediary ring 18 and a complementary conical surface 24 of the internal clamping ring 19.

The connection between the armouring 4, formed by the layers 5 and 6, and the coupling 11, is achieved by clamping this armoring between the wall of a conical bore 25 of the clamping ring 17 and the conical wall 26 of the intermediary ring 18, while the ends of the layers 5 and 6, housed in an annular space 27 provided between the external ring 16 and the intermediary ring 18, are anchored in this annular space, by injecting through an opening 28 of the external ring 16 a solidifiable material such as a metal alloy or a polymerizable epoxy-resin.

It will obviously be possible to substitute for the channel 15 an orifice establishing a communication between the bore 12 and the annular space 27. It is possible in this way, by injecting through the openings 28 one and the same polymerizable material, to provide for the anchoring of armouring 3 in the bore 12 and of armouring 4 in the annular space 27. In this case, the material which is used will be selected among those which provide a good anchoring of the armouring 3, while properly filling the bore 12.

There will be used, for example, to this end, a polymerizable epoxy resin, such as the one sold under the trade mark ARALDITE.

What I claim is:

1. A flexible armoured pipe having a rigid coupling comprising
    at least one flexible tubular core,
    at least one first armouring surrounding said core, said first armouring including an elongated member helically wound with a short pitch around said core,
    coupling means having a rigid body member positioned at the end of the tubular core and said first armouring, said coupling means including first clamping means for clamping said tubular core and means for anchoring said armouring, wherein said means for anchoring includes at least one bore means within said rigid body member for housing an end of said armouring and channel means through said rigid body member for introducing solidifiable material into said bore means such that said end of said armouring is anchored in said coupling means,
    at least one second armouring provided around said at least one first armouring, said second armouring including two layers of wires helically wound in opposite directions with a large pitch over said first armouring,
    second clamping means for clamping said two layers and securing said second armouring to said coupling means,
    second bore means for housing ends of said two layers of said second armouring, said solidifiable material being introduced into said second bore means for anchoring said ends of said two layers,
    an outer tubular covering arranged over said first and second armourings, and
    third clamping means for securing said outer covering to said coupling means.

2. A flexible armoured pipe having a rigid coupling according to claim 1, wherein said helical winding of said elongated member forming said first armouring with a small pitch is cut substantially along a cross-section of said elongated member at the end of said armouring housed in said one bore means.

3. Flexible pipe according to claim 2, wherein the solidifying material injected into said second bore is formed by a molten metal or a metal alloy having a melting temperature lower than the maximum temperaure that the elements constituting the flexible pipe can withstand and whose solidification occurs substantially without volume variation.

4. Flexible pipe according to claim 2, wherein the solidifying material injected into said second bore is a polymerizable epoxy resin.

5. A flexible armoured pipe according to claim 1, wherein said solidifiable material is a metallic material having a melting temperature lower than the maximum temperature that the elements constituting said flexible pipe can withstand, and being solidified without substantial volume variation.

6. A flexible armoured pipe according to claim 1, wherein said solidifiable material is a polymerizable epoxy resin.